United States Patent [19]

White et al.

[11] 4,199,661

[45] Apr. 22, 1980

[54] METHOD AND APPARATUS FOR ELIMINATING CONFLICTS ON A COMMUNICATION CHANNEL

[75] Inventors: Philip E. White, Richfield; Eugene G. Blumke, Bloomington, both of Minn.

[73] Assignee: Control Data Corporation, Minneapolis, Minn.

[21] Appl. No.: 903,345

[22] Filed: May 5, 1978

[51] Int. Cl.² .............................................. H04Q 9/00
[52] U.S. Cl. ................................. 370/91; 340/147 LP
[58] Field of Search .......... 179/15 A, 15 AL, 15 AQ, 179/15 BA; 325/57; 340/147 LP, 147 R; 364/200; 178/50

[56] References Cited

U.S. PATENT DOCUMENTS

| | | | |
|---|---|---|---|
| 3,485,953 | 12/1969 | Norberg | 325/57 |
| 3,634,627 | 1/1972 | Velentini | 179/15 BA |
| 3,818,447 | 6/1974 | Craft | 340/147 LP |
| 4,074,233 | 2/1978 | Swain | 340/147 LP |

*Primary Examiner*—Bernard Konick
*Assistant Examiner*—Joseph A. Popek
*Attorney, Agent, or Firm*—Robert M. Angus

[57] ABSTRACT

A method and apparatus is provided for eliminating conflicts on a communication channel, and particularly on a shared communication channel having a plurality of active stations, each capable of seizing use of the channel. A counter at each station contains a representation of the identity (address) of the station having the current opportunity to seize use of the channel. The representation is sequentially altered to provide the opportunity to each station to seize use of the channel, and each station not having such opportunity is inhibited from seizing the channel. The representations in the counters are synchronized each time a station seizes use of the channel, and may also be synchronized if no station seizes use of the channel.

24 Claims, 3 Drawing Figures

Fig.1

METHOD AND APPARATUS FOR ELIMINATING CONFLICTS ON A COMMUNICATION CHANNEL

This invention relates to a method and apparatus for eliminating conflicts on a communication channel, and particularly to apparatus for sequentially allocating use of a communication channel to each of a plurality of stations sharing that channel.

BACKGROUND

As used herein, the term "communications channel" concerns a data bus providing shared communications among a plurality of stations. Typically, the stations comprise components of a data processing system, such as processors, device controllers, etc. Typically, the channel or bus is shared by a plurality of "active" stations, any of which can initiate communications; "passive" stations, namely those stations capable of responding when addressed but which cannot independently initiate an exchange of communications, may also be included.

Shared communications is ordinarily accomplished by either of two basic techniques (although, as will be understood, refinements of both are possible): time division (e.g. multiplexing) and contention.

In a pure contention channel, an active station transmits onto the channel whenever it has a message to send. One problem with such pure channels resides in the fact that if two or more stations are ready to transmit over the same time period, there will be a mutual garbling of messages as the messages overlap. While pure channels may be adequate for light traffic channels, the channels are not capable of being greatly expanded to serve more stations because the channels may not be capable of handling the increased traffic resulting from more stations. Further, the repeating of garbled messages tends to increase traffic on the channel, thereby increasing the likelihood of further garbling of messages.

To overcome some of the problems with pure contention channels it has been common to provide lock-out of all nontransmitting stations while the channel is active, such systems sometimes being called "carrier sense multiple access" systems. Thus, a "channel active" status is imposed on the channel by a transmitting station, and any station ready to transmit will have to wait until the channel becomes idle before a transmission can be initiated. Typically, the "channel active" status is merely the carrier signal of the message being transmitted by a using station. However, if two or more stations are awaiting a channel idle status, they may both seize the channel as soon as the channel becomes idle, thereby resulting in garbled messages and the necessity to repeat transmissions. To overcome this problem, it has been the practice to inhibit each station from seizing the channel for some unique predetermined period of time following channel idle status. This technique, sometimes called "priority ordering", provides a different time delay for each station, and the likelihood of conflict between two or more stations becomes quite remote. In effect, by allocating different time delays to the several stations, the stations have fixed orders of priorities with those stations having shorter time delays having greater priority over stations with longer time delays. While for many applications it is possible to allocate less important stations to the lower priorities to thereby adequately serve all stations, such an arrangement may not be satisfactory in environments where some stations cannot be appreciably subordinate to other stations. In this respect, certain system designs may require each station to have substantially equal priority to all other stations. Also, in extremely high traffic channels significant delays may occur before lower priority stations are able to seize the channel, as higher priority stations prevent such lower priority stations from being served.

Another technique, sometimes called "listen-while-talk", which is also an improvement of the carrier sense multiple access system, provides that each station "listen" to all transmissions, including its own, and if a garbling of messages occurs during a station's transmission (i.e., due to another station's transmission), the transmitting stations both abort transmission. Usually, the time that a station listens to the channel during its own transmissions is at least as long as the maximum propagation delay of the channel or bus, and usually a priority ordering as discussed above is accomplished to lessen the likelihood that the two stations will again conflict for use of the channel during retransmission.

Another technique, also an improvement of the pure contention channel discussed above, permits the garbling of messages to occur and provides a random access to the channel upon retransmissions.

Time division systems contemplate the assigning of specific time slots to each station or user during which it may transmit on the bus. Some systems require the station to complete use of the bus during the assigned time slot, while others merely require that a station initiate transmission during the time slot. A central station is provided in such systems to assign the time slots and control the transmissions and use of the channel. Time division techniques often employ time division multiplexing, or interrogation-responder techniques (e.g. polling and reservation systems).

For a further discussion of such contention and time division systems, reference may be had to "Time Division Digital Bus Techniques Implemented on Coaxial Cable" by N. B. Meisner et al in Proceedings of Computer Networking Symposium, Dec. 15, 1977, pp 112–117; "The Information Bus" by R. R. Everett in Signal, October, 1975, pp 12–14; "A Time Division Multiple Access System for Digital Communication" by D. G. Willard in Computer Design, June 1974; and "The Cable Bus in Data Communications" by V. A. DeMarines et al in Datamation, August 1976.

The present invention is concerned with certain improvements in time division systems, except that instead of employing a central station to assign fixed time slots, each station stores a representation (address) of the identity of the station having the opportunity to seize use of the channel and the representations are substantially simultaneously altered to permit other stations access to the channel or bus. Hence, the present invention offers the advantages of the contention systems (namely, absence of expensive central control equipment and the ability to use stations which themselves can initiate transmissions without direction of a central station) while at the same time employing fixed time slots for each station (thereby, avoiding any possibility of conflicts or contention for use of the channel).

OBJECTIVES

It is, therefore, a primary object of the present invention to provide a technique whereby the stations may be individually allocated the opportunity to seize use of a communication channel, and that allocation may be sequentially altered.

It is another object of the present invention to provide, for a shared communication channel having a plurality of active stations, each of which is capable of seizing use of the channel, apparatus for sequentially altering the allocation of the opportunity to seize use of the channel to the various stations. It is a further object of the present invention to provide apparatus whereby use of the channel is allocated among the stations and the allocation is sequentially altered, all without the control or interference of a central station.

In accordance with the present invention, conflicts on a communication channel or bus shared by a plurality of stations, each of which is capable of seizing use of the channel, is eliminated by providing each station with counter means capable of storing a representation identifying the station which has the opportunity to seize use of the channel. Compare means is provided for comparing the representation stored in said counter means with the address associated with the respective station; the compare means providing a time slot signal permitting the station to seize use of the channel when a comparison is detected. Clock means sequentially alters the representation in each counter means to thereby give opportunity to another station to seize use of the channel. Means connects each of said register means to said channel to synchronize all representations in the counter means whenever a station seizes use of the channel.

One feature of the present invention resides in the provision of means for inhibiting alteration of the representations in all of said counter means during periods that the channel is active.

Another feature of the present invention resides in the provision of means for synchronizing the representation in all of said counter means upon completion of a predetermined number of alterations of the representation in said counter means without seizure of use of the channel by a station.

Another feature of the present invention resides in the inclusion, in the representation in all the counter means, of the address of the station having the opportunity to seize use of the channel, and the periodic alteration of such representation to advance to the address of a different station.

DETAILED DESCRIPTION

The above and other features of this invention will be more fully understood from the following detailed description and the accompanying drawings, in which.

Figure 1:
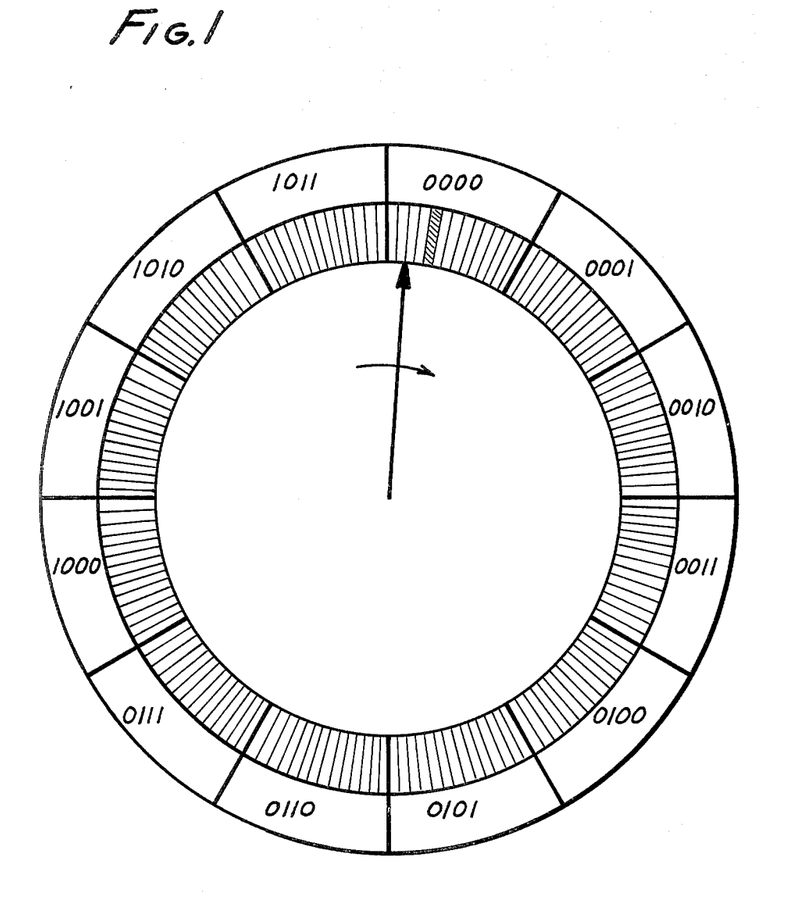
FIG. 1 is a diagram useful in explaining the operation of the present invention.

With reference to the drawings, and particularly to FIG. 1, there is illustrated a diagram useful in explaining the nature of the operation of the present invention. The circle depicted in FIG. 1 includes inner and outer rings; the outer ring being divided into 12 equal slots, numbered 0000 through 1011 (binary 0 through 11), and the inner ring being further divided into a plurality of subslots. (As will be made evident hereinafter, there are preferably 512 subslots for each slot, but less are shown in the drawing for sake of clarity.) A pointer is depicted in FIG. 1 as pointing to one of the subslots within the slot identified as 0000. Let it be assumed that the pointer is rotating clockwise at the rate of one subslot each 20 nanoseconds. It is therefore evident that the pointer will remain within each slot for 10.24 microseconds (for the condition wherein there are 512 subslots in each slot).

Let it be assumed that when the pointer reaches the fifth subslot of each slot, the station which corresponds to the slot number to which the pointer resides will be permitted to seize use of the channel. If all stations have such a pointer arrangement, and if all pointers are exactly in synchronism, the several stations will be allocated the opportunity to seize use of the channel in sequence. Let it further be assumed that when a station actually seizes use of the channel, rotation of all pointers are halted. Theoretically, all of the pointers will halt at exactly the same slot and subslot. However, as will be more fully understood hereinafter, the "pointers" may not be exactly in synchronism and propagation delays associated with the seizing of the channel by one station may not be sensed by the other stations until their "pointers" have advanced a number of subslots past the one where the seizing station's "pointer" halted. Accordingly, it may be necessary to resynchronize the pointers upon each seizing of the channel. Further, to avoid a station from immediately re-seizing the channel upon relinquishing its use, it may be necessary to reset all pointers to a subslot more advanced than that which gave access to the seizing station.

Figure 2:
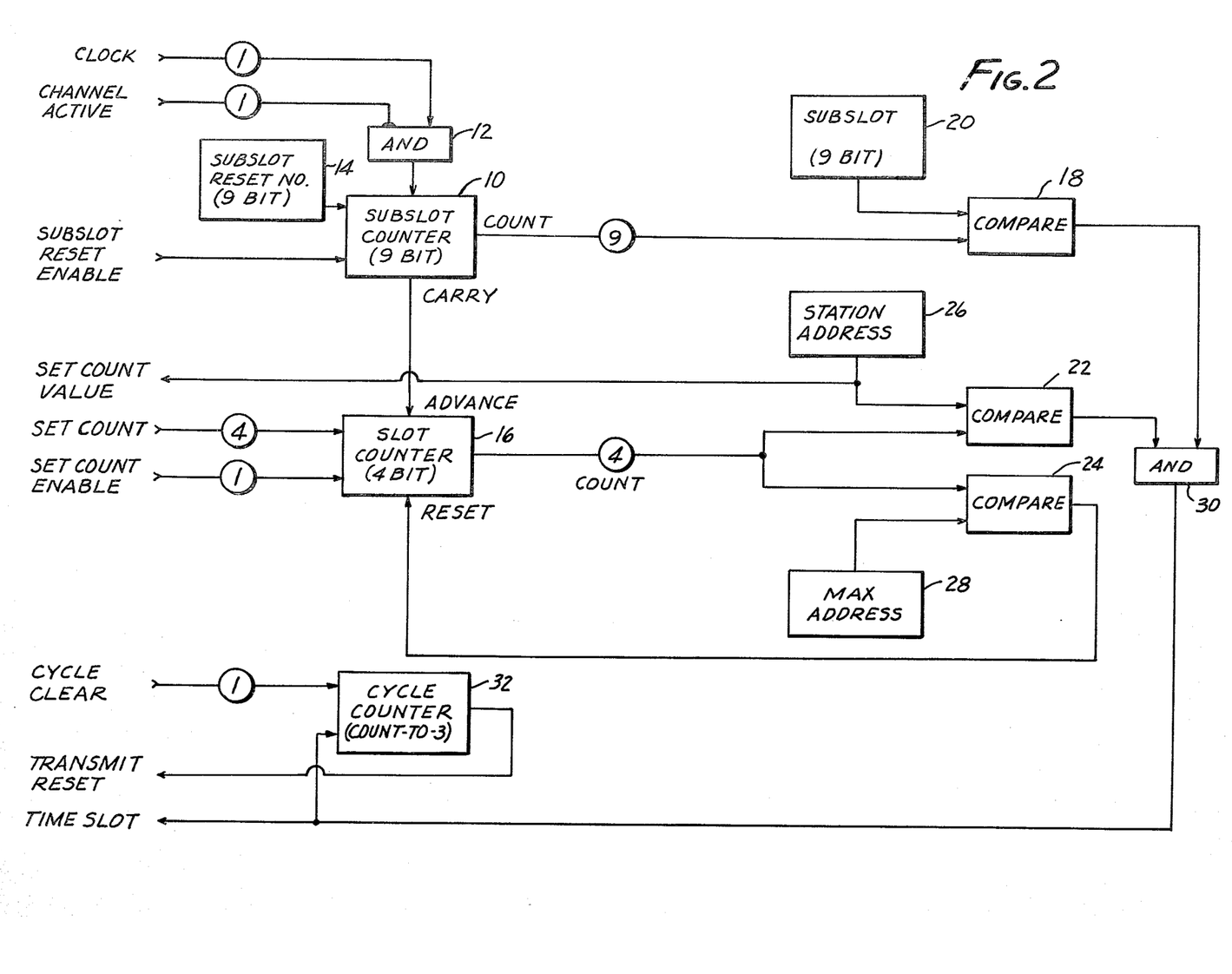
FIG. 2 is a block circuit diagram of an allocation and control apparatus for a station of a shared communication channel in accordance with the presently preferred embodiment of the present invention.

With the foregoing in mind, reference may now be made to FIG. 2, which is a block circuit diagram of the apparatus in accordance with the presently preferred embodiment of the present invention. The apparatus shown in FIG. 2 is the allocation and control apparatus for a single station of a shared communication channel.

A typical system will include the communication channel and a plurality of stations, at least some of which are active stations; that is, stations, which can initiate communications. A typical station may include, for example, a processor, a peripheral device, such as a memory or a disc drive for a data processing system as well as a device controller. The device controller provides the interface between the device and the communication channel or bus. The controller has a unique address which, for example, may be represented in binary code (and in the example to be herein given it will be assumed that the address comprises a four-bit code, thereby permitting up to sixteen unique addresses). Since the peripheral devices, device controllers and communication channel are well known in the art, they are not shown in the drawings. Suffice it to say, however, and as will become apparent hereinafter, it is preferred that the device controllers not include the predetermined unique delay circuitry as used in prior systems to fix priority of the stations. (The delay circuitry is omitted because time slot allocation is established by the apparatus shown in the drawings.)

With reference to FIG. 2, there is illustrated a subslot counter 10 having a first input from AND gate 12, a second input from subslot reset number 14, and a subslot reset enable input from the channel controller. Counter 10 provides a carry output to the advance input of slot counter 16, which in turn has a set count input and a set count enable input from the controller. AND gate 12 has a clock input and an inhibited input connected to a channel active signal, both from the controller. Counter 10 provides a subslot count output to a first input of comparator 18, whose second input is connected to receive a subslot transmit number 20. Counter 16 provides a slot count output to a first input of each of comparators 22 and 24, the second input of comparator 22 being connected to receive the local station address 26 and the second input of comparator 24 being connected to receive the maximum address 28. The outputs of comparators 18 and 22 are connected to separate inputs of AND gate 30, which in turn provides a time slot signal output to the controller. The output of comparator 24 is connected to the reset input of counter 16. Cycle counter 32 has a first input connected to receive the time slot signal from AND gate 30, and has a second input connected to receive a cycle clear signal from the controller. The output of counter 32 provides a transmit reset signal to the controller.

For purposes of illustration, counter 10 may be a 9-bit counter and counter 16 may be a 4-bit counter. Subslot reset number 14 and subslot transmit number 20 are preferably hardwire connections to suitable sources of binary "1"s and "0"s to provide fixed numbers for input to counter 10 and comparator 18. It is preferred that the transmit number is less than the reset number; for example, the transmit number may be 000010000 whereas the reset number may be 001000000 (indicative of the 16th and 64th subslots, respectively). The subslot transmit and reset numbers are preferably the same in all stations. Station address 26 and maximum address 28 are preferably embodied in four-bit hexadecimal manual switches connected to comparators 22 and 24 to provide binary inputs representative of the local station address and the maximum number of any station on the channel, respectively. For example, if there are twelve active stations associated with the channel with addresses of 0000 through 1011, the maximum address 28 set in all stations will be 1100, whereas the local station address will be that of the local station. It is preferred that the local address and maximum address be set in each station with hexadecimal switches to permit changing and resetting of the address values to thereby permit expansion of the system. (The local station address and maximum address may be embodied in fixed registers, but the use of hexadecimal switches is preferred as being less costly. Further, the local station address 26 may actually be included in the station controller, but it is shown in FIG. 2 for purposes of explanation.) In networks subject to repeated modification (for example if terminals are often moved from place to place for connection to the network) it may actually be more convenient to set maximum address 28 to a greater number to permit expansion without readjusting the other stations, but this may mean that dormant time slots will occur if a lesser number of stations are connected to the bus.

For purposes of explanation, it will be assumed there are twelve active stations associated with the communications channel having address of 0000 through 1011 (0-11). Therefore, binary twelve (1100) is set in all maximum addresses 28. It will further be assumed that the subslot transmit number is 000010000 (16) and the subslot reset number is 001000000 (64), which are the same in all stations. It is further assumed that all counters are in relative synchronism and that the counts in counters 10 are all less than binary 16 and that counters 16 all contain a count of binary 7 (0111), which is the address of the eighth station. It will also be assumed that neither the eighth nor the ninth station is ready to transmit (nor will they be ready to transmit when accorded the opportunity to seize use of the channel), but that the tenth station is ready to use the channel.

Under the conditions stated, and assuming the channel is inactive, AND gates 12 of each station pass respective clock pulses to the subslot counters 10. The counts in counters 10 are continuously compared by comparator 18 against the number established by subslot transmit number 20 (assumed to be binary 16). When the counts in counters 10 reach binary 16, comparator 18 detects a comparison which provides an output to the AND gates 30. Since it is assumed that the slot counters 16 all contain binary 7 (0111), the comparators 22 in all stations except that having an address of 0111 note a non-comparison. In the eighth station, however, comparator 22 notes a comparison between the local station address (0111) and the count in counter 16 to provide a second input to AND gate 30. Thus, AND gate 30 of the eighth station provides a pulse output in the form of a time slot signal to the controller of that station, enabling the station to seize use of the channel.

It has been assumed, however, that the eighth station is not ready to seize use of the channel. Therefore, no channel activity occurs by virtue of the time slot signal in the eighth station, and the clocks in all stations continue to step the count in subslot counters 10. Wgen the counts in counters 10 reach a maximum value (111111111) the next clock pulse will reset the subslot counters 10 to zero and force a carry pulse to the advance input of slot counters 16, thereby increasing the counts in slot counters 16 to 1000, representative of the address of the ninth station. When the subslot counters again reach a count indicative of the subslot transmit number, the comparators 18 again pass a signal to the respective AND gates 30. Since the slot counters now contain 1000, only the comparator 22 of the ninth station operates to enable AND gate 30 to initiate a time slot signal. However, the ninth station is assumed not to be ready to seize use of the channel, so no channel activity occurs and the clocks in all stations continue to advance the counts in the subslot counters 10.

The counts in subslot counters 10 continue to advance to a full condition, and the counts in slot counters 16 advance to 1001, indicative of the tenth station which has been assumed to be ready to seize use of the channel. When the subslot counters 10 reach binary 16, comparators 18 note a comparison and forward a signal to one input of the AND gates 30. Since the slot counter is set to 1001, which is the address of the tenth station, the comparator 22 in the tenth station notes a comparison and AND gate 30 of the tenth station process a time slot signal to the controller of the tenth station. Since the tenth station is ready to use the channel, the tenth station controller responds to the time slot signal to impose a message carrier on the channel. The message carrier is received by all controllers to impose a "channel active" signal into the respective AND gates 12. AND gates 12 are inhibited AND gates whose operation is inhibited by the presence of the channel active signal. As a result, when AND gates 12 receive the channel active signal, the AND gates no longer will pass clock pulses to the respective subslot counters 10, at least until the message carrier ceases and the channel active signal is removed. Consequently, the counts in subslot counters 10 and slot counters 16 are not advanced. (If all counters are exactly in synchronism, the counts in all subslot counters 10 will hold at binary 16, which is also the subslot transmit number, and the counts in all slot counters 16 will hold at 1001, the address of the tenth station. As will be more fully understood hereinafter, the counts in counters 10 probably will not be exactly synchronized, but this factor will not alter operation of the apparatus for reasons yet to be explained.)

When a seizing station seizes use of the channel, the controller imposes the station address onto the channel. This may, for example, be taken from the hexadecimal switch containing station address 26 taken off the set count value line therefrom. This value is imposed on the set count input lines to all slot counters 16 via the respective controllers. Additionally, the controllers also provide a subslot reset enable signal, set count enable signal and cycle clear signal to counters 10, 16 and 32, respectively. Upon receipt of the set count value from station ten and the set count enable, the slot counters 16 in all stations will be loaded with a binary 1001, indicative of the address of the tenth station. In reality, that value should already have been in the slot counters, but this feature ensures synchronization of all slot counters. Upon activation of the subslot reset enable signal, all subslot counters 10 will be loaded to the value established by subslot reset number 14 (herein assumed to be binary 64). Resetting the subslot counters to a number greater than the subslot transmit number (assumed to be binary 16) assures that all subslot counters will be synchronized and assures that the seizing station (the tenth station in this example) does not immediately re-seize the use of the channel when channel idle status is again achieved. Thus, it is evident that each time a station seizes use of the channel, all counters 10 and 16 are substantially synchronized.

When the seizing station is completed with the channel, the channel active signal is removed thereby removing the inhibit signal from AND gates 12 and permitting the clocks to advance the counts in subslot counters 10. Hence, the process will continue.

It will be readily appreciated that once a station seizes use of the channel, the channel is entirely dedicated to that station, but only for so long as that station requires use of the channel. A seizing station might, for example, transmit a message to another station, hold the channel until the receiving station transmits a reply, and continue to hold the channel until the reply message is verified for accuracy, all as well-known in the art. Thus, if a seizing station initiates communication with another station, the second station does not impose its address onto the channel to cause any change in the contents in counters 16. (In this respect, the responding station may be an active or a passage station and may or may not have an address. Further, if the responding station is a passive station, it would not have the apparatus described above.)

When the counts in counters 16 reach that of the highest or maximum number of stations on the channel (indicative of the total number of devices on the channel—which in the example is assumed to be 1100), comparator 24 notes the comparison to the value set by maximum address 28 to reset counter 16 to 0000.

Preferably, the count in maximum address 28 is one greater than the greatest address of any station on the channel. Thus, as soon as the counts in counters 16 advance to binary 1100, a comparison is noted by comparator 24 to immediately reset the counts in counters 16 to zero. (Alternatively the counts in maximum address 28 may be set to the greatest address (1011 in the example), but the resetting of counter 16 must then be delayed until the station having address 1011 has had the opportunity to seize use of the channel.) If the number of stations using the channel happens to equal the capacity of the channel (16 in the example where 4-bit addresses are employed), the resetting of counter 16 as well as the maximum address 28 and compare 24 may be omitted (assuming counter 16 may be automatically reset to zero following its maximum count). This assures that the next station given access to the channel is the one with the lowest address, so time will not be wasted giving access to nonexistent stations.

Each time an AND gate 30 issues a time slot enable signal to the associated station, the count in the associated cycle counter 32 advances by one. Each time a station seizes use of the channel, all controllers impose a "cycle clear" signal onto counters 32 to thereby reset all counters 32 to zero. However, if all stations are inactive and therefore are given the opportunity to seize the channel but do not, each counter 32 is advanced by one each time the corresponding station was given the opportunity to seize the channel. If the count in one of the counters 32 advances to three (indicative of no activity on the channel for three full cycles of allocation for each station), the counter 32 reaching three initiates a "transmit reset" signal to the peripheral device controller associated with that counter 32 forcing that controller to seize use of the channel. The station seizing the channel will transmit its address via the "set count" lines to all counters 16 to synchronize the counts in counters 16 and will force all subslot counters to the subslot reset number as heretofore described. Thus, the synchronization of the counts in counters 10 and 16 are assured. Therefore, it will be appreciated that resynchronization of the counts in all counters 10 and 16 occurs each time a station seizes the channel, and in no event less often than every third principal cycle (or thirty-six slot cycles in the case where twelve units are on the channel). It will also be appreciated that the act of resynchronizing via initiation of the "transmit reset" signal activates the counters 16 via their respective "set count" inputs to thereby reset all counters 16. Further, when a station seizes use of the channel, whether by initiation transmission or by initiating a "transmit reset" sequence, the subslot count in all counters 10 stations will also be synchronized.

It will be appreciated to those skilled in the art that the number of stations can be increased above sixteen given in the example by increasing the size of counters 16 and by increasing the capacity of compare units 22 and 24. For example, up to 32 stations can be accommodated by a five-bit code or 64 stations by a six-bit code.

It will be appreciated that the clock associated with each counter 10 may be a local clock unit at each station, or may be a master clock for the entire channel. Preferably, however, there is a separate crystal-controlled clock for each station contained in the station's control unit. In any case, the clock pulses provided to the counters 10 should be substantially synchronized and at the same rate.

Figure 3:
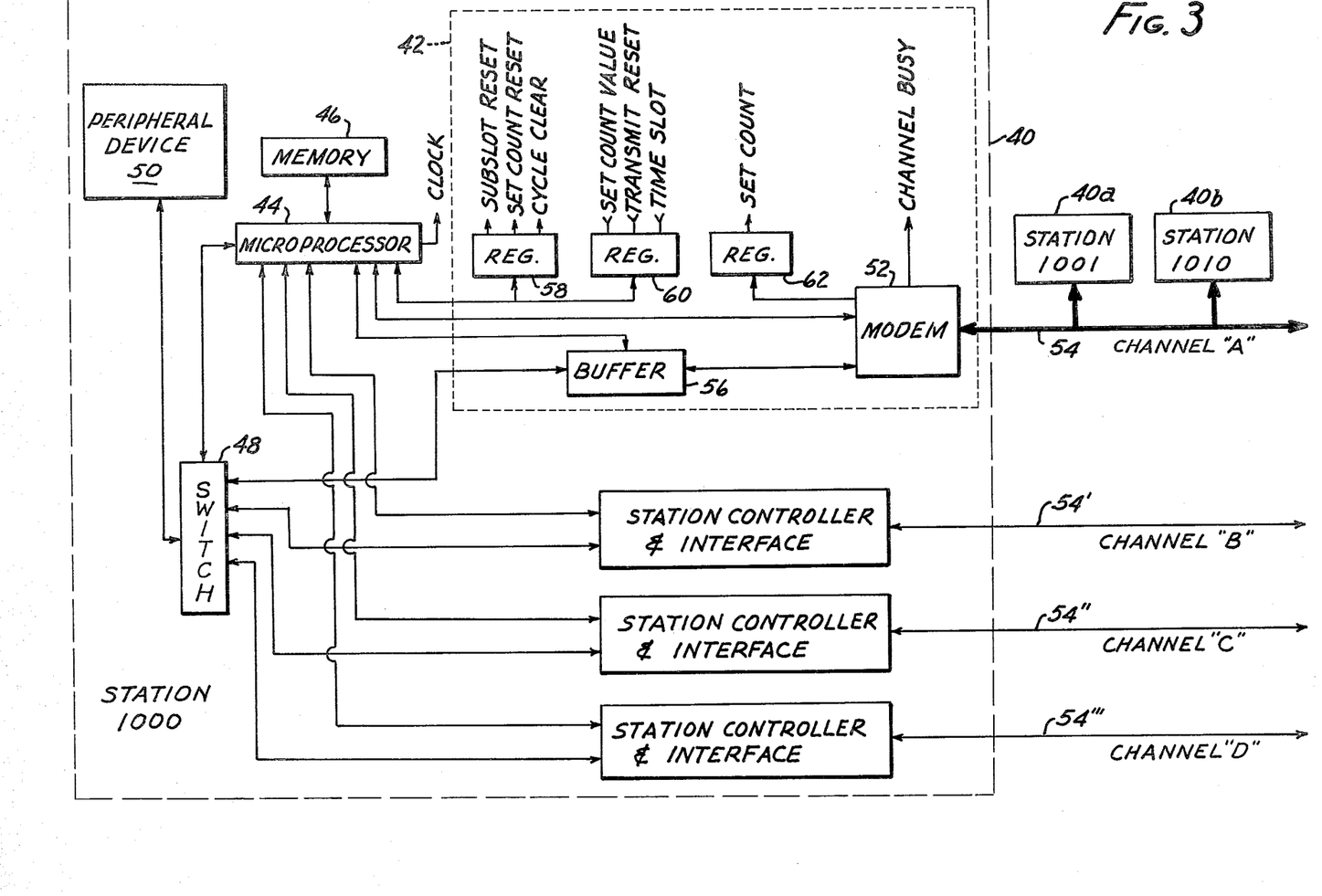
FIG. 3 is a simplified block circuit diagram of a typical station controller used with the apparatus shown in FIG. 2.

FIG. 3 is a block circuit illustrating the environment of the apparatus depicted in FIG. 2. A typical station 40 (depicted in FIG. 3 as having an address "1000") includes a station controller and interface 42, a microprocessor 44 having a memory 46, switching unit 48 and a peripheral device 50. The peripheral device may, for example, be a data processing unit, an input/output terminal, a disc memory, or any other element or device which would be part of an information handling system. The station controller and interface 42 may, for example, include a suitable modem 52 for data interface between a channel 54 and the device 50. Typically buffer 56 is connected between the device 50 and modem 52. Station controller and interface 42 may also include registers 58, 60 and 62, two of which may be connected to microprocessor 44 to handle the subslot reset signal, the set count reset signal, the cycle clear signal, the set count value signal, the transmit reset signal and the time slot signal to and from the apparatus shown in FIG. 2. The third register 62 may store the set count signal from modem 52. The clock signal may be supplied by a clock within the modem and the channel busy signal may be supplied by the modem. Additional stations 40a, 40b, etc., are likewise connected to channel 54.

When the transmit reset or time slot signal is received from the apparatus shown in FIG. 2, it is stored in register 62 for operation on the microprocessor. In the case of a transmit reset signal, the microprocessor extracts the set count value from register 60 and commands modem 52 to seize use of channel 54 to set the channel busy signal on all modems and to synchronize the contents of counters 16 (FIG. 2) in all stations via registers 62. Particularly, the transmitting station imposes a message on the channel having a message carrier, the latter being sensed by the other modems to establish the channel active signal. The crystal controlled clocks in the microprocessors are also essentially synchronized. This also will initiate, via all the microprocessors, a subslot reset signal, set count reset signal and cycle clear signal via the registers 58, all for the purposes heretofore explained.

In the case of a time slot signal, the microprocessor operates modem 52 only if the device 50 is ready to seize use of the channel, a procedure well known in the art utilizing the microprocessor as the control for the device 50.

As shown in FIG. 3, it is possible to have the device 50 common to several shared communications channels, 54, 54′, 54″, and 54‴. In this case, there will be a separate station controller and interface unit 42, 42′, 42″ and 42‴ for each channel, each being connected to a separate allocation and control unit as depicted in FIG. 2 and all under control of microprocessor 44. Where several channels share the use of a device 50, an electronic switch 48 will be required, operating under the control of the microprocessor, to direct communications between the device 50 and the proper station controller and interface unit. If only one channel is employed, switch 48 may be omitted and microprocessor 44 and memory 48 may be part of the controller and interface 42.

It will be recognized that the distance between stations connected to a channel may be quite large (e.g., on the order of several thousand feet). Therefore, delays caused by signal propagation delays must be accounted for in the design of the system. Further, since the message carrier signal from a seizing station may be received at different times by the other stations (due to signal propagation delays), there must be sufficient time between transmit subslots to permit all stations to receive transmissions on the channel before allocating the channel to another station. A subslot width of 20 nanoseconds (to permit a station to seize use of the channel) separated by a dormant width of 10.24 microseconds, has been found adequate in most cases for distances of the order of less than about 2000 feet.

To start the system, it is preferable to have one station assigned the task of system synchronization. For example, the station assigned start-up tasks may initiate a "transmit reset" signal to thereby insert its address into all slot counters 16 and to synchronize the subslot counters 10. The "transmit reset" signal may also be employed to synchronize the clocks in all stations. (Alternatively, all stations can be programmed to automatically reset their counters 16 to a pre-assigned address during start-up, but this procedure may require additional hardware.)

It is evident that during start-up, the clocks in the stations synchronized to the station employed in the start-up lag the clock in the initiating station by a time delay representation of the propagation delay. Further, when a station seizes use of the channel or initiates a "transmit reset" signal, as heretofore described, the clocks in the other stations lag that of the seizing station by the propagation delay. Therefore, it is apparent that the maximum delay on the channel between transmission by one station and reception by another is 2t where t is the propagation time between the two "worst case" stations. (This occurs because the seizing station's clock might already lag that of the receiving station by the propagation delay, t, so that when the channel active or "transmit reset" signal is received by the receiving station, it "sees" a delay of 2t.) Therefore, the slot widths should be greater than 2t, and the minimum slot width for counters 16 should be 2t plus the maximum amount of drift which may occur in the clocks over the maximum time period between "transmit reset" sequences. A slot width of about 10.24 microseconds for counters 16 has been found adequate for channel distances of less than about 2000 feet. Thus, a clock rate and subslot width of 20 nanoseconds is adequate for the apparatus as described.

It is possible to shorten the delay by having each station sense the carrier signal and the station which generated it. Each station could, therefore, calculate the probable propagation delay in receiving the carrier signal and reset its clock and subslot counter accordingly. For example, the subslot reset number 14 could be received from the microprocessor via the controller, and a maximum count could be controlled for counter 10 to permit shortened slot lengths and more accurate synchronization of the counts in counters 10. It is theorized that the maximum delay could be shortened to t, or even shorter, depending upon system configuration and software control. A shortened time delay will, of course, permit an increased clock rate and shortened slot width.

It is evident from the foregoing that the indications stored in each counter 16 are independently and essentially simultaneously changed each time the counts in counters 10 reach a maximum, and it is likewise evident that the counts in counters 10 are also independently and essentially simultaneously advanced. It is likewise evident that the counts in counters 10 and 16 are substantially in synchronism. In this respect, counters 10 are essentially or substantially in synchronism in the sense that time slot signals will not be issued to two or more stations in conflict, and counters 16 are essentially or substantially in synchronism in the sense that when a subslot transmit number is reached by each of the stations during any particular major cycle (slot) the stations will each contain the same count in the respective counters 16 when the subslot transmit slot is reached, regardless of any minor missynchronization.

It will be appreciated that the present invention may utilize existing hardware of certain stations. For example, if certain stations included or comprised a microprocessor, the counters, comparators and registers described above may comprise memory locations and calculator portions of the microprocessor, in which case the mechanism would be programmed to perform as herein described. It will also be appreciated that by altering the indications in counters 16 in "sequence", we do not intend to be limited to a fixed numerical progression as described herein, but instead the sequence may be any desired sequence including forward, reverse, pseudo-random or combinations thereof. It is preferred that whatever sequence is employed, the stations each have a statistically equal number of assigned time slots, although it will be evident that if certain stations are assigned use of the channel more often than others, the sequence may be arranged to provide statistically more time slots for such stations. Further, while the counters 10 and 16 have been described as binary counters, it is evident that feedback shift registers, programmable logic array and ring counters may be used, and the term "counter means" as used herein is intended to embrace such items.

The present invention thus provides a system for allocating the opportunities of a plurality of active stations of a communication channel to seize use of the channel, whereby the allocation is sequentially altered, all without the control of or necessity for, a central station. The technique is effective in operation and overcomes many of the difficulties associated with prior contention channels. Particularly, with the present invention, it is now possible to provide shared communications channels with greater traffic density without the risk of garbled messages and without fixed priorities which might tend to subordinate certain stations to low priorities.

This invention is not to be limited by the embodiment shown in the drawings or described in the description, which is given by way of example and not of limitation, but only in accordance with the scope of the appended claims.

What is claimed is:

1. Apparatus for allocating use of a communication channel shared by a plurality of stations, each station having a respective address and each station having controller means responsive to a time slot signal to enable the station to seize use of the channel, said apparatus comprising, at each of said stations: first counter means for storing a representation of the address of the station which has the current opportunity to seize use of the channel; generator means for providing said time slot signal; first compare means connected to said first counter means for comparing the representation stored in said first counter means with the address associated with the respective station, said first compare means enabling said generator means to provide said time slot signal when a comparison is detected; clock means for sequentially altering the representation stored in the respective first counter means at predetermined times, said controller means connecting each of said first counter means to said channel to synchronize the representation stored in all of said counter means when a station seizes use of said channel.

2. Apparatus according to claim 1 wherein said controller means imposes a carrier signal onto said channel when the respective station seizes use of said channel, each of said clock means being connected to the respective controller means and responsive to said carrier signal to inhibit alteration of the representation stored in the respective first counter means.

3. Apparatus according to claim 1 wherein said generator means includes second counter means connected to said clock means for advancing in count, said second counter means having a carry output connected to said first counter means for altering the representation stored in said first counter means when said second counter means achieves a full count, and gate means connected to said first compare means and to said second counter means for providing said time slot signal when said first compare means detects a comparison between the representation stored in said first counter means and the address associated with the respective station and a first predetermined count is achieved in said second counter means.

4. Apparatus according to claim 3 further including means for resetting the count in said second counter means to a second predetermined count when the controller means detects that the channel is active.

5. Apparatus according to claim 4 wherein said second predetermined count is greater than said first predetermined count.

6. Apparatus according to claim 4 further including second compare means for comparing the representation stored in said first counter means with a representation of the address of that station connected to the channel having the maximum address, said first counter means being responsive to a comparison detected by said second compare means to reset the representation stored in said first counter means to the representation associated with that station connected to the channel having the lowest address.

7. Apparatus according to claim 6 further including third counter means responsive to said time slot signal for advancing in count each time said gate means provides a time slot signal to the respective station, said third counter means providing a transmit reset signal when a predetermined count is reached in said third counter means, the controller means of the respective station being responsive to said transmit reset signal to seize use of said channel to synchronize the representations in all of said first counter means, said third counter means being connected to said controller means and responsive to the detection of a channel active status of said channel by said controller means to reset said third counter means to zero.

8. Apparatus according to claim 7 wherein said controller means imposes a carrier signal onto said channel when the respective station seizes use of said channel, each of said clock means being connected to the respective controller means and responsive to said carrier signal to inhibit alteration of the representation stored in the responsive second counter means.

9. Apparatus according to claim 6 wherein said controller means imposes a carrier signal onto said channel when the respective station seizes use of said channel, each of said clock means being connected to the respective controller means and responsive to said carrier signal to inhibit alteration of the representation stored in the respective second counter means.

10. Apparatus according to claim 4 further including third counter means responsive to said time slot signal for advancing in count each time said gate means provides a time slot signal to the respective station, said third counter means providing a transmit reset signal when a predetermined count is reached in said third counter means, the controller means of the respective station being responsive to said transmit reset signal to seize use of said channel to synchronize the representation in all of said first counter means, said third counter means being connected to said controller means and responsive to the detection of a channel active status of said channel by said controller means to reset said third counter means to zero.

11. Apparatus according to claim 4 wherein said controller means imposes a carrier signal onto said channel when the respective station seizes use of said channel, each of said clock means being connected to the respective controller means in responsive to said carrier signal to inhibit alteration of the representation stored in the respective second counter means.

12. Apparatus according to claim 3 further including second compare means for comparing the representation stored in said first counter means with a representation of the address of that station connected to the channel having the maximum address, said first counter means being responsive to a comparison detected by said second compare means to reset the representation stored in said first counter means to the representation associated with that station connected to the channel having the lowest address.

13. Apparatus according to claim 12 further including third counter means responsive to said time slot signal for advancing in count each time said gate means provides a time slot signal to the respective station, said third counter means providing a transmit reset signal when a predetermined count is reached in said third counter means, the controller means of the respective station being responsive to said transmit reset signal to seize use of said channel to synchronize the representations in all of said first counter means, said third counter means being connected to said controller means and responsive to the detection of a channel active status of said channel by said controller means to reset said third counter means to zero.

14. Apparatus according to claim 3 further including third counter means responsive to said time slot signal for advancing in count each time said gate means provides a time slot signal to the respective station, said third counter means providing a transmit reset signal when a predetermined count is reached in said third counter means, the controller means of the respective station being responsive to said transmit reset signal to seize use of said channel to synchronize the representations in all of said first counter means, said third counter means being connected to said controller means and responsive to the detection of a channel active status of said channel by said controller means to reset said third counter means to zero.

15. Apparatus according to claim 3 wherein said controller means imposes a carrier signal onto said channel when the respective station seizes use of said channel, each of clock means being connected to the respective controller means and responsive to said carrier signal to inhibit alteration of the representation stored in the respective second counter means.

16. Apparatus according to claim 1 further including second compare means for comparing the representation stored in said first counter means with a representation of the address of that station connected to the channel having the maximum address, said first counter means being responsive to a comparison detected by said second compare means to reset the representation stored in said first counter means to the representation associated with that station connected to the channel having the lowest address.

17. Apparatus according to claim 16 further including second counter means responsive to said time slot signal for advancing in count each time said generator means provides a time slot signal to the respective station, said second counter means providing a transmit reset signal when a predetermined count is reached in said second counter means, the controller means of the respective station being responsive to said transmit reset signal to seize use of said channel to synchronize the representations in all of said first counter means, said second counter means being connected to said controller means and responsive to the detection of a channel active status of said channel by said controller means to reset said second counter means to zero.

18. Apparatus according to claim 1 further including second counter means responsive to said time slot signal for advancing in count each time said generator means provides a time slot signal to the respective station, said second counter means providing a transmit reset signal when a predetermined count is reached in said second counter means, the controller means of the respective station being responsive to said transmit reset signal to seize use of said channel to synchronize the representations in all of said first counter means, said second counter means being connected to said controller means and responsive to the detection of a channel active status of said channel by said controller means to reset said second counter means to zero.

19. The method of allocating use of a communication channel shared by a plurality of stations, each station being capable of siezing use of the channel, each station containing counter means for storing a representation of the identity of one of the stations, said method comprising: providing the opportunity to seize use of the channel to the one station whose representation is stored in each of said counter means while simultaneously inhibiting all other stations from seizing use of the channel; independently and essentially simultaneously changing the representations in all of said counter means to a representation of the identity of another station; and essentially synchronizing the representations stored in all of said counter means when a station seizes use of the channel.

20. The method according to claim 19 further including inhibiting the change of representations in said counter means during periods when a station has seized use of the channel.

21. The method according to claim 20 further including changing all of the representations in said counter means in sequence to thereby sequentially allocate the opportunity to each station to individually seize use of the channel.

22. The method according to claim 19 further including essentially synchronizing the representation in all of said counter means upon completion of a predetermined number of changes of such representations in one of said counter means without seizure of use of the channel by a station.

23. The method according to claim 22 further including inhibiting the change of representations in said counter means during periods when a station has seized use of the channel.

24. The method according to claim 23 further including changing all of the representations in said counter means in sequence to thereby sequentially allocate the opportunity to each station to individually seize use of the channel.

* * * * *

UNITED STATES PATENT AND TRADEMARK OFFICE
CERTIFICATE OF CORRECTION

PATENT NO. : 4,199,661
DATED : April 22, 1980
INVENTOR(S) : P. E. White et al

It is certified that error appears in the above—identified patent and that said Letters Patent is hereby corrected as shown below:

Column 6, line 25, for "Wgen" read -- When --

Claim 8, last line, for "responsive" read -- respective --

Signed and Sealed this

First Day of July 1980

[SEAL]

Attest:

SIDNEY A. DIAMOND

Attesting Officer    Commissioner of Patents and Trademarks